(12) United States Patent
Woodford

(10) Patent No.: US 10,993,091 B2
(45) Date of Patent: *Apr. 27, 2021

(54) EMERGENCY LOCATION INFORMER SYSTEM

(71) Applicant: Eli Technology Inc., Halifax (CA)

(72) Inventor: Peter Woodford, Halifax (CA)

(73) Assignee: ELI TECHNOLOGY INC., Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/757,393

(22) PCT Filed: Oct. 18, 2018

(86) PCT No.: PCT/CA2018/051316
§ 371 (c)(1),
(2) Date: Apr. 18, 2020

(87) PCT Pub. No.: WO2019/075569
PCT Pub. Date: Apr. 25, 2019

(65) Prior Publication Data
US 2020/0413221 A1    Dec. 31, 2020

Related U.S. Application Data

(63) Continuation of application No. 15/788,749, filed on Oct. 19, 2017, now Pat. No. 10,187,756.

(51) Int. Cl.
*H04W 4/30* (2018.01)
*H04W 64/00* (2009.01)
(Continued)

(52) U.S. Cl.
CPC ............... *H04W 4/30* (2018.02); *H04W 4/02* (2013.01); *H04W 4/029* (2018.02); *H04W 4/90* (2018.02); *H04W 64/00* (2013.01)

(58) Field of Classification Search
None
See application file for complete search history.

(56) References Cited

U.S. PATENT DOCUMENTS 7,054,645 B1    5/2006 Infosino
7,245,900 B1    7/2007 Lamb et al.
(Continued)

FOREIGN PATENT DOCUMENTS

JP    2003-047033 A    2/2003

*Primary Examiner* — German Viana Di Prisco
(74) *Attorney, Agent, or Firm* — TIPS Group

(57) ABSTRACT

An emergency location informer system includes: an emergency mobile positioning (EMP) server; an emergency service number (ESN) database server storing civic addresses and associated tags that are provided by an internet service provider (ISP) over the IP network; a wireless access point (AP) EMP-AP component executing on a processor of an AP at a civic address known to the ISP, the EMP-AP component providing a tag, known to the ISP, forming a part of a radio frequency (RF) beacon signal transmitted by the AP; and a mobile operating system (OS) EMP-OS component executing on a processor of a cell phone and operative to monitor the beacon signal of the AP and to store the tag, the EMP-OS component being further operative to embed the tag in an emergency call from the cell phone to the EMP server over a network.

21 Claims, 6 Drawing Sheets

(51) Int. Cl.
　　　*H04W 4/90*　　(2018.01)
　　　*H04W 4/02*　　(2018.01)
　　　*H04W 4/029*　　(2018.01)

(56) References Cited

U.S. PATENT DOCUMENTS

| | | |
|---|---|---|
| 8,290,470 B2 | 10/2012 | Ray et al. |
| 8,442,482 B2 | 5/2013 | Maier et al. |
| 8,718,596 B1 * | 5/2014 | Xue .................. H04W 76/50 455/404.2 |
| 9,179,280 B2 | 11/2015 | Ray et al. |
| 2008/0056251 A1 | 3/2008 | Zheng |
| 2008/0080535 A1 | 4/2008 | Li et al. |
| 2008/0132197 A1 | 6/2008 | Koepke |
| 2008/0162516 A1 | 7/2008 | Shinomiya |
| 2008/0255944 A1 | 10/2008 | Shah et al. |
| 2009/0063706 A1 | 3/2009 | Goldman et al. |
| 2010/0008337 A1 | 1/2010 | Bajko |
| 2010/0220700 A1 | 9/2010 | Hodroj et al. |
| 2012/0162013 A1 | 6/2012 | Piersol et al. |
| 2013/0122851 A1 | 5/2013 | Michaelis et al. |
| 2013/0143518 A1 | 6/2013 | Singer et al. |
| 2016/0077186 A1 | 3/2016 | Snapp |
| 2016/0077196 A1 | 3/2016 | Dehlink et al. |
| 2016/0309026 A1 | 10/2016 | Sterman et al. |
| 2016/0330769 A1 | 11/2016 | Edge |
| 2017/0013435 A1 | 1/2017 | Singer et al. |
| 2017/0041963 A1 | 2/2017 | Edge |
| 2017/0099584 A1 | 4/2017 | Bhanot et al. |
| 2017/0171754 A1 | 6/2017 | South et al. |
| 2017/0295479 A1 | 10/2017 | Artuso |
| 2018/0295479 A1 | 10/2018 | Hassan et al. |
| 2020/0045665 A1 * | 2/2020 | Kuang ................ H04B 17/318 |

* cited by examiner

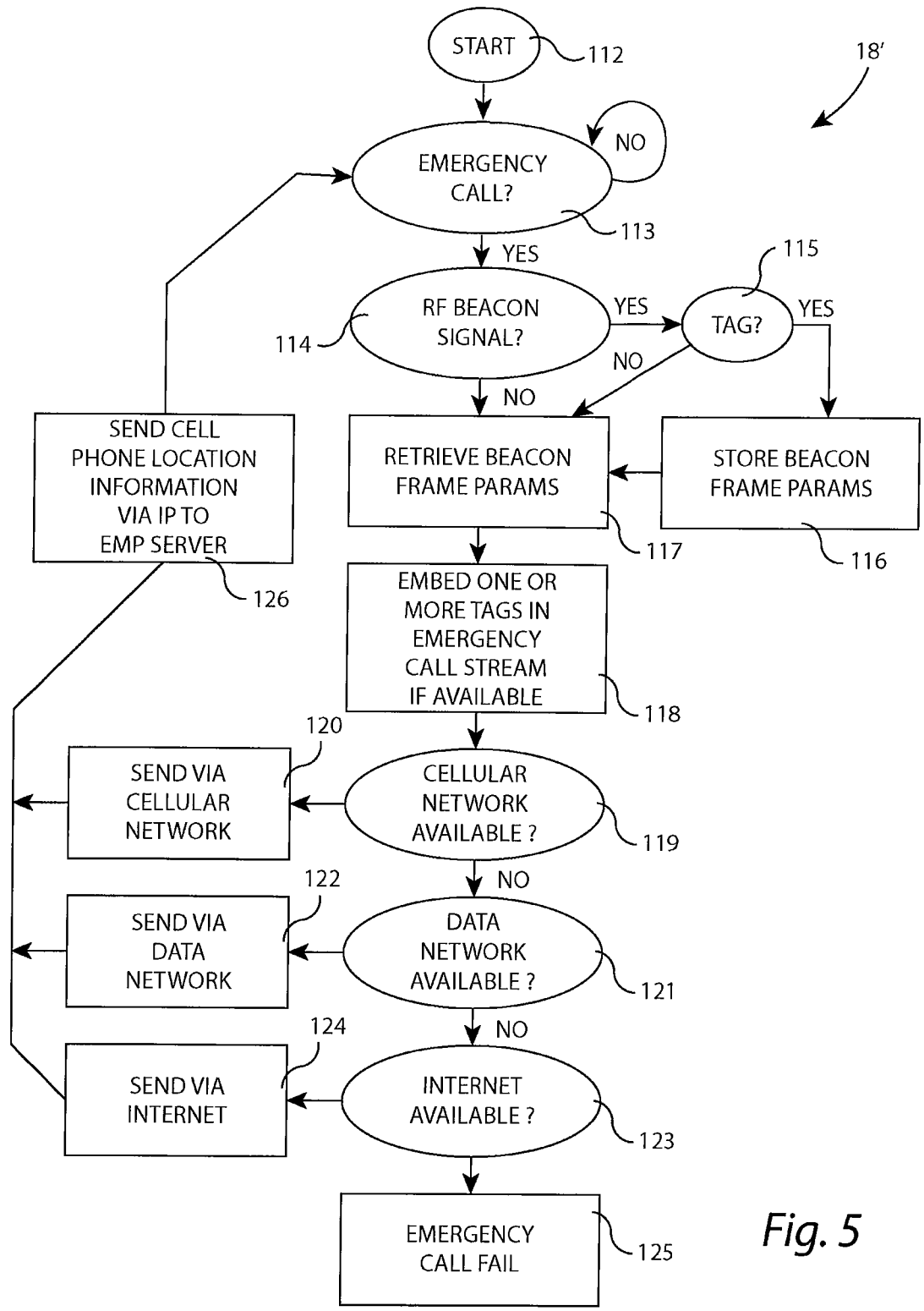

EMERGENCY LOCATION INFORMER SYSTEM

RELATED APPLICATIONS

This application claims priority from U.S. application Ser. No. 15/788,749 filed 19 Oct. 2017, which is hereby incorporated herein by reference.

BACKGROUND

Traditionally, telecommunications have been performed over the public switch telephone network (PSTN). A system to maintain addresses and other location information of the subscribers of telecommunications companies operating on the PSTN was developed to provide addresses and locations to emergency first responders. Determining the location of subscribers of the telecommunications companies was relatively easy as the locations of telephones were known by the telecommunications companies or carriers due to installing the telephones, establishing billing, or otherwise.

Telecommunications have been changing rapidly over the past several years, primarily since the development and growth of the mobile telephone industry. As a result, the predominant manner in which consumers communicate has changed and the ability of an Emergency Service Number (ESN) server to associate a location or address with a phone number is not possible. Mobile devices now account for over 70% of emergency calls, and with existing location methodologies an ESN server can only provide, at best, an estimated location represented by a circle on a map, as opposed to a verified civic address, e.g. an official street address of a dwelling or building.

New forms of telecommunications including Voice Over Internet Protocol (VOIP) have been developing as well. With the new forms of telecommunications, subscribers are able to use wireless devices that may access different wireless access points to communicate over a communications network, such as the internet. For example, Unlicensed Mobile Access (UMA) allows internet protocol (IP) access to core networks of many mobile carriers. The primary method for locating a wireless device using UMA access is by using the Global Positioning System (GPS) functionality of the device. However, GPS has limited accuracy, particularly in urban areas where the bulk of emergency calls originate.

One common interface for wireless access to a communications network includes an IEEE 802.11 communications protocol, which is commonly known as WiFi, and within the industry as Unlicensed Mobile Access (UMA). Standards for UMA have been established between the mobile industry and WiFi industry associations. Wireless devices are being configured to have WiFi communications protocols to enable a subscriber to access WiFi enabled access points. Many WiFi enabled wireless devices have global positioning system (GPS) capabilities that are able to communicate the GPS location information (i.e., latitude and longitude coordinates) of the WiFi enabled device. While GPS location information may be helpful to track or locate a person at an estimated geographical location, such information is not extremely useful in an emergency situation where emergency rescue teams, such as firemen and police, better understand civic address (e.g. street address) information for performing an emergency rescue in an emergency situation.

A public safety answering position (PSAP), or emergency call center, is used by emergency services to answer calls from the public to notify emergency personnel, such as police or firemen, to respond to an emergency situation. Traditionally, a caller contacts a PSAP by dialing 911 (or 112 in Europe) and provides location information during the telephone call. When caller identification (i.e., caller ID) was introduced, PSAPs were installed with telephone systems compatible with caller ID to identify names and phone numbers of individuals placing emergency 911 calls. This first version of caller ID is known as type I caller ID. Type I caller ID operates in a single data message format (SDMF) as well as multiple data message format (MDMF) that provide a caller's telephone number, date and time of the call during the ringing interval. A second type of caller ID or type II caller ID was later developed to communicate name and address information of a second calling party to a called party when a call between a called party and a first calling party is in progress. Type II caller ID uses a multiple data message format (MDMF) that communicates a caller's name, telephone number, date and time.

Enhanced 911 (E911) is a North American Telephone Network (NATN) feature of the 911-emergency-calling system that uses a reverse telephone directory provided by cellular telephone companies to determine location information of a caller. There are two types of E911 systems that operate within the United States, namely, Phase I and Phase II. E911 Phase I systems are required to provide an operator with the telephone number, originator, and location of the cell site or base station receiving a 911 call. E911 Phase II systems are required to use an automatic location identification (ALI). However, only 18% of all PSAPs are configured with E911 Phase II systems. The remaining 82% of PSAPs are configured with E911 Phase I systems, which are incapable of handling GPS coordinates, and, therefore, subscribers who have wireless telephones that use GPS coordinates for 911 emergency calls cannot be properly serviced by these PSAPs. If a caller is using a non-cellular wireless device, such as a WiFi enabled wireless device, an operator at a PSAP with E911 Phase I capabilities is unable to determine address location based on GPS coordinates that are received from the caller. Also, because WiFi enabled wireless devices do not communicate via a cellular network, there is no cell site or base station location information to be communicated to the PSAP. Furthermore, the billing address associated with a cell phone is not necessarily considered the location to which emergency responders should be sent, since the device is portable. This means that locating the caller is more difficult, and there is a different set of legal requirements.

Accurate and automatic mobile emergency location is the biggest challenge in the ESN Industry. As noted above, currently about 70% of emergency calls come from mobile devices. Current methodologies are all network centric and layered over a cellular network. For example, approximate location can be determined using GPS, Assisted GPS (AGPS), cell tower triangulation, and cell tower signal strength/power measurements. Unfortunately, these techniques only provide a rough estimate of a caller's location (e.g. a circle on a map) not a dispatchable civic address.

In U.S. Pat. No. 9,179,280, Ray et al. disclose a system and method for providing location information to a public safety answering point during an emergency 911 call from a WiFi handset. When a user of a WiFi handset makes an emergency 911 call, the GPS location of the handset and its mobile directory number is received at a network access (WiFi) access point. The WiFi access point adds address information to the GPS and mobile directory number of the handset and send the information to a PSAP over the internet. This is a WiFi handset-only solution, and presupposes that the WiFi handset can access the WiFi Access point through its security layer, that there is a good connection to the internet, and that the PSAP is capable of receiving and processing internet calls.

While the methodology describe above by Ray et al. can work for WiFi phones, cell phones are programmed to use the cellular network to transmit emergency calls. Additionally, WiFi phones are specific to a Local Area Network (LAN) where a "controller" receives communications from the Wi-Fi handset, recognizes it is an emergency call and then obtains location information. While this can be effective for a managed LAN or a controlled environment (e.g. a shopping mall, large corporation or plant) it would not be functional or capable for widespread use.

In U.S. Patent Pub. No. 2017/0171754, South et al. disclose a method for secure, beacon-based emergency location including detecting, with an app executing on a user device, a signal from a nearby beacon, and transmitting app verification information to the beacon, which then sends beacon verification information including the app verification information to both the user device and an emergency verification server. The method also includes authenticating, with the emergency information server, the beacon verification information to verify that the user device is physically proximate to the beacon and, if the beacon verification information is authentic, determining the geographical location of the user device based upon the geographical location of the beacon. This solution presupposes that the app is installed, activated and is functional on the mobile device, that the beacon that the mobile device can access the beacon through its security layer (if any), that there is good connection to the internet, and that all of the verifications have been met.

This system described by South et al., is believed to be very difficult to implement. Regulatory issues will be many and the anticipated cost to deploy and maintain beacons will be great. Furthermore, the complexity of verifications and/or utilization of public and private keys would introduce many new elements into the current emergency systems that operators may be reluctant to implement due to the high costs of installation, maintenance, quality control and system management for a new system.

These and other limitations of the prior art will become apparent to those of skill in the art upon a reading of the following descriptions and a study of the several figures of the drawing.

SUMMARY

In an embodiment, set forth by way of example and not limitation, an emergency location informer system includes: an emergency mobile positioning (EMP) server communicating over a public switched telephone network (PSTN), a cellular network and an internet protocol (IP) network; an emergency service number (ESN) database server storing civic addresses and associated tags that are provided by an internet service provider (ISP) over the IP network; a wireless access point (AP) EMP-AP component executing on a processor of an AP at civic address known to the ISP, the EMP-AP component providing a tag, known to the ISP, forming a part of a radio frequency (RF) beacon signal transmitted by the AP; and a mobile operating system (OS) EMP-OS component executing on a processor of a cell phone and operative to monitor the beacon signal of the AP and to store the tag, the EMP-OS component being further operative to embed the tag in an emergency call from the cell phone to the EMP server over a network; whereby the EMP server receives the tag embedded in the emergency call such that a civic address associated with the tag can be retrieved from the ESN database server.

In another example, an emergency mobile positioning server includes: a processor; a public switched telephone network (PSTN) interface coupled to the processor; a cellular network interface coupled to the processor; an internet protocol (IP) network interface coupled to the processor; memory coupled to the processor, including code segments executable by the processor including: (a) code segments receiving an emergency call with an embedded tag via one or more of the PSTN interface, the cellular network interface, and the IP network interface; (b) code segments querying an emergency service number (ESN) database server via the IP network interface with the tag to obtain civic address information; and (c) code segments directing the emergency call with the embedded tag to an emergency call center associated with the civic address information.

An example of a non-transitory computer readable media comprising code segments executable on a processor of a wireless access point (AP) includes: code segments communicating tag information with an ISP coupled to the AP at a civic address; code segments embedding the tag in a beacon frame; and code segments transmitting the beacon frame as a radio frequency (RF) beacon signal.

Another example of a non-transitory computer readable media comprising code segments executable on a processor of a cell phone including: code segments monitoring radio frequency (RF) beacon signals for wireless access point (AP) tags that are associated with civic addresses; code segments storing the AP tags in a memory of the cell phone; code segments detecting an emergency call being made by the cell phone; and code segments embedding at least one of the AP tags in the emergency call.

An advantage of methods and systems disclosed herein is that the location of cell phone users making emergency calls can be determined with greater accuracy without changing legacy emergency call centers.

Another advantage of methods and systems disclosed herein is that the EMP-OS component is embedded into the OS of a mobile device, which includes existing protocols for handling emergency calls.

Yet another advantage of methods and systems disclosed herein is that the tag(s) embedded into the emergency call stream by the EMP-OS component can be used to determine the location of the caller without disclosing private information.

A still further advantage of methods and systems disclosed herein is that the location information of access points is provided by a trusted source, e.g., an Internet Service Provider.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 5 is a flow diagram of a process implemented by the mobile app of FIG. 4;

DETAILED DESCRIPTION OF EXAMPLE EMBODIMENTS

Figure 1:
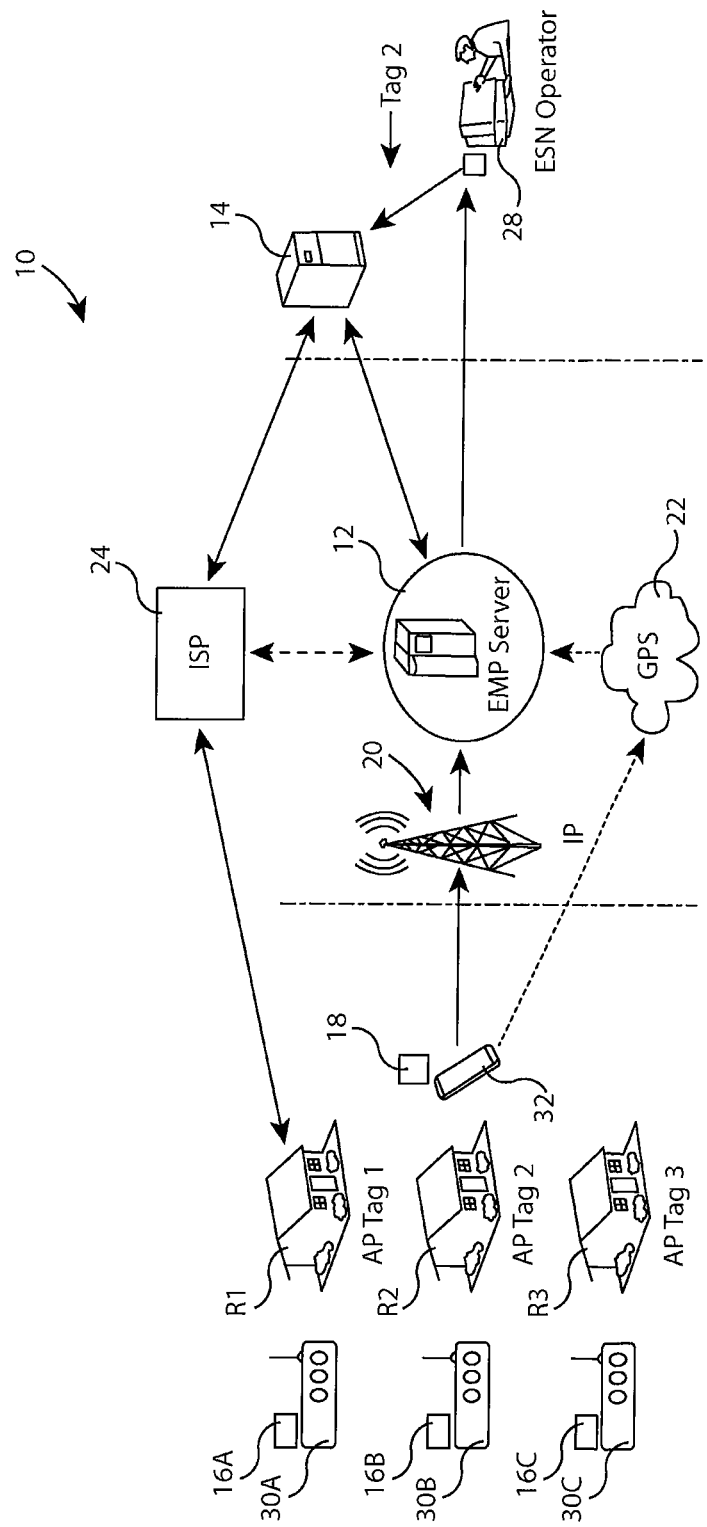
FIG. 1 is an illustration of an Emergency Services Number (ESN) system.

In FIG. 1, an Emergency Services Number (ESN) system 10 comprises ESN mobile positioning servers, devices and components including an emergency mobile positioning (EMP) server 12, an emergency service number (ESN) database (DB) server 14, wireless access point (AP) 30, an EMP-AP component 16, and a cellular telephone (cell phone) EMP-OS component 18. The EMP-AP component 16 includes code segments that are incorporated into the operating system of an access point, e.g. via an Application Programming Interface (API), a Software Design Kit (SDK) or otherwise. The EMP-OS component 18 includes code segments that are integrated into the operating system of a cell phone, such that it is always active. The ESN system 10 also includes devices, components and systems of third parties, including the cellular telephone network 20, the internet 22, internet service providers 24, ESN operator stations 28, wireless access points (APs) 30 (labeled individual here as 30A, 30B, and 30C, by way of examples) and cell phone(s) 32. As used herein, the terms "cell phone", "mobile device", "handset" and the like are often used synonymously.

In this example, there are three residential homes R1, R2 and R3, each having a civic address, and each of which receive internet services from ISP 24. It will be appreciated that in other embodiments, the residential homes may receive internet services from different or multiple ISPs. Also in this example, APs 30A, 30B and 30C are located within homes R1, R2, and R3, respectively, and are thereby associated with the same civic addresses as the houses.

Figure 2:
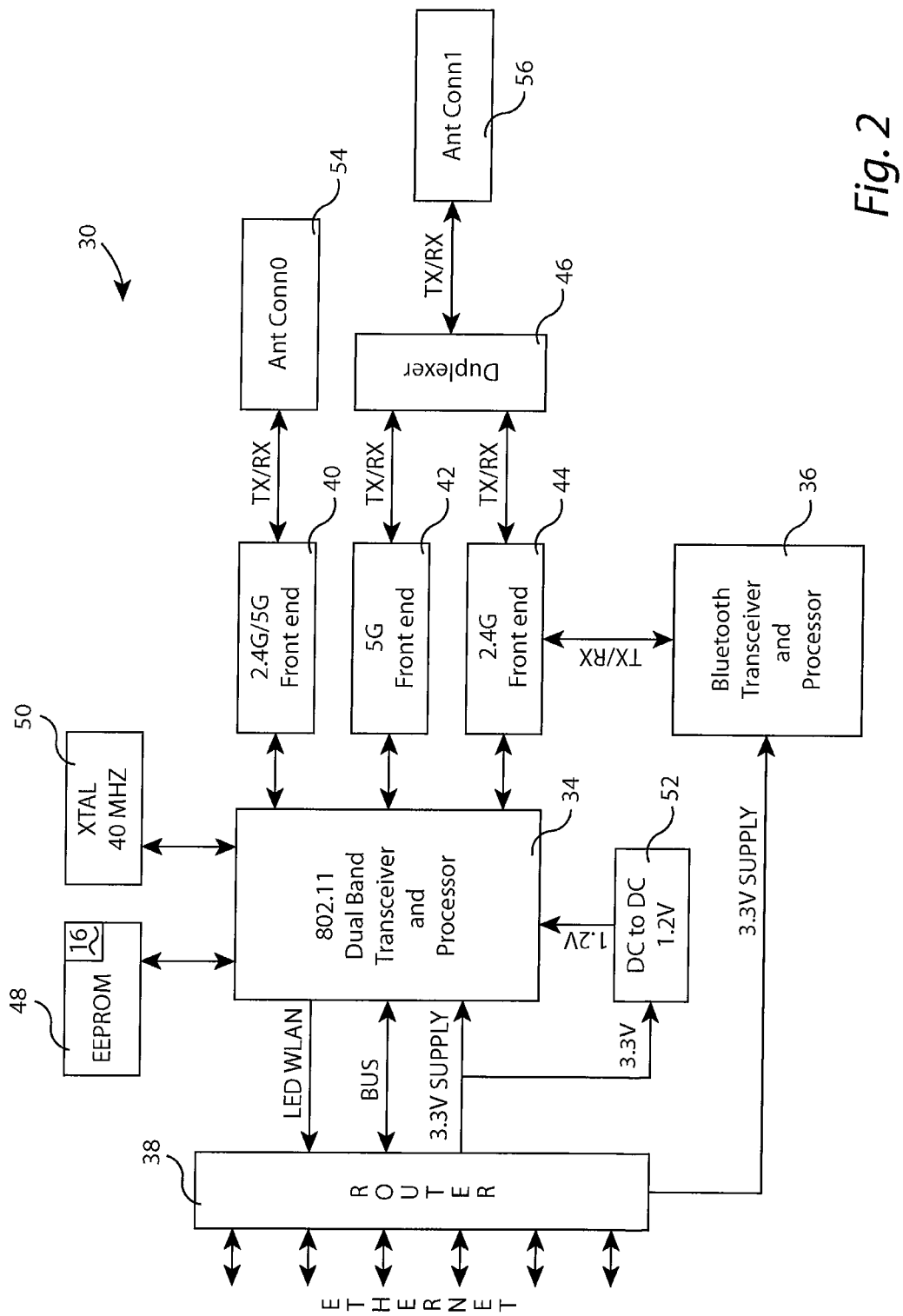
FIG. 2 is a block diagram of a wireless access point (AP) forming a part of the ESN system.

In FIG. 2, a AP 30, set forth by way of example but not limitation, includes a WiFi device 34, a Bluetooth device 36, a router 38 having one or more wired Ethernet connections, a 2.4G/5G front end 40, a 5G front end 42, a 2.4G front end 44, and a duplexer 46. As will be appreciated by those of skill in the art, WiFi is a technology for wireless local area networking with devices based upon the IEEE 802.11 (and subsequent advanced standards inclusively) standards. WiFi most commonly uses the 2.4 gigahertz Ultra High Frequency (UHF) and 5 gigahertz Super High Frequency (SHF) Industrial, scientific and medical (ISM) radio bands. The WiFi device 34 can be, by way of example, an 802.11 dual band transceiver and processor, such as the BCM4352 dual-band radio made by Broadcom Limited of San Jose, Calif. Coupled to the WiFi device 34 are electrically erasable, programmable read-only memory (EEPROM) 48, a quartz crystal (XTAL) 50, and a direct current (DC) to DC converter 52. A first antenna connection 54 is coupled to front end 40 and a second antenna connection 56 is coupled to duplexer 46.

Both the WiFi device 34 and the Bluetooth device 36 can be programmed to transmit "beacons", which are used to periodically broadcast information concerning at least the presence of the device. In addition, beacons often include additional information, such as the network configuration, timing codes, etc.

Infrastructure network access points, such as APs, use beacon frames to send beacon signals at defined intervals, which is sometimes set to a default 100 ms. A beacon frame is one of the management frames in IEEE 802.11 based WLANs, and includes an Ethernet header, body and frame check sequence (FCS). Some of the fields of a WiFi beacon frame include:

Timestamp—after receiving the beacon frame, all the stations change their local clocks to this time. This helps with synchronization.

Beacon interval.

Capability information (16 bits)—capability of the device/network including type of network, support for polling, encryption details, etc.

Service Set Identifier (SSID) is a sequence of 0-32 octets. It is used as an identifier for a wireless LAN, and is intended to be unique for a particular area. It is often a human readable string entered by a user, aka "network name."

EMP-AP components 16 comprise code and libraries to embed a "tags" into the beacon frames of APs 30. The EMP-AP components 16 are generated by the ISP 24 (or other ISPs) and are loaded into a memory of the APs 30, e.g. in EEPROM 48, and are associated with the known civic address of the AP. The EMP-APs 16 may comprise a part of the edge software of the APs 16, or may comprise software development kits (SDKs) which become associated with the edge software of the access points. It should be noted that the code segments of the EMP-APs 16 do not necessarily communicate with the APs 16, in that they may not be able to penetrate their security layer, and to the extent that there is communication with an AP, such communication is limited. For example, such communication would not allow the SSID to be user-modified. Also, the tags generated by the EMP-APs 16 are preferably not modifiable by the user of the mobile device, for security and privacy issues.

The civic address of the WiFi access point is known because it is connected to a wired internet access point known to the ISP. For example, if the internet access point was installed and was serviced with one or more Universal Resource Locators (URLs) at the civic address of 123 Main Street, Anytown, Minn., the ISP would know, with some certainty, that the AP 30 was at that civic address, absent some extreme measures taken by a user to defeat that certainty. Since the ISP has a vested interest in knowing the civic address of the WiFi AP, the ISP becomes a trusted $3^{rd}$ party provider ("trusted source") of accurate civic address information. In addition to storing the EMP-AP components 16 in the APs 30, the ISP trusted source maintains a database of tags and their associated civic addresses in ESN DB server 14. An ESN operator 28 can then query ESN DB server 14 with a tag, and retrieve the civic address associated with that tag.

Figure 3:
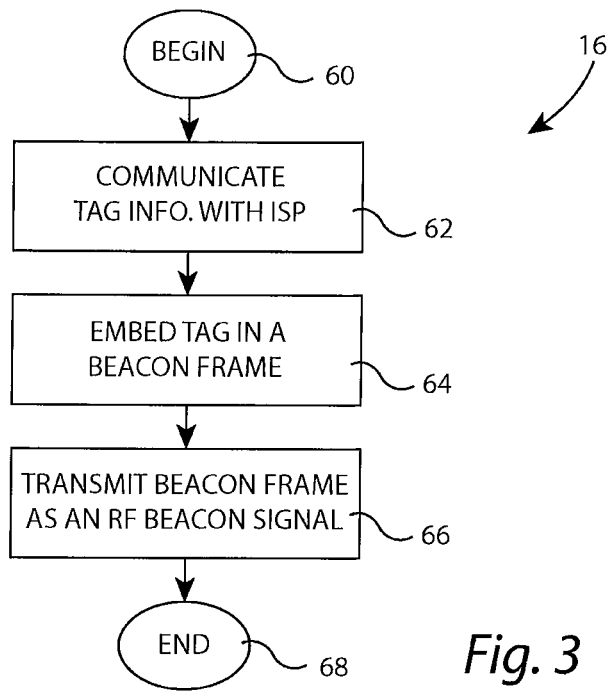
FIG. 3 is a flow diagram of a process implemented by the AP of FIG. 2.

In FIG. 3, an example EMP-AP component process 16 begins at 60 and, in an operation 62, code segments communicate tag information with the ISP. The tag information can be generated by the AP, or by the ISP, or jointly by the AP and the ISP. The tag information (tag) is associated with the civic address of the AP, which is known to the ISP. The AP is also known to the ISP by, for example, the universal resource locator(s) (URLs) assigned to that AP by the ISP. Next, in an operation 64, the tag is embedded in a beacon frame along with other beacon information normally provided by an AP. Finally, the beacon frame is transmitted on a periodic basis in an operation 66 as radio frequency (RF) beacon signal.

Figure 4:
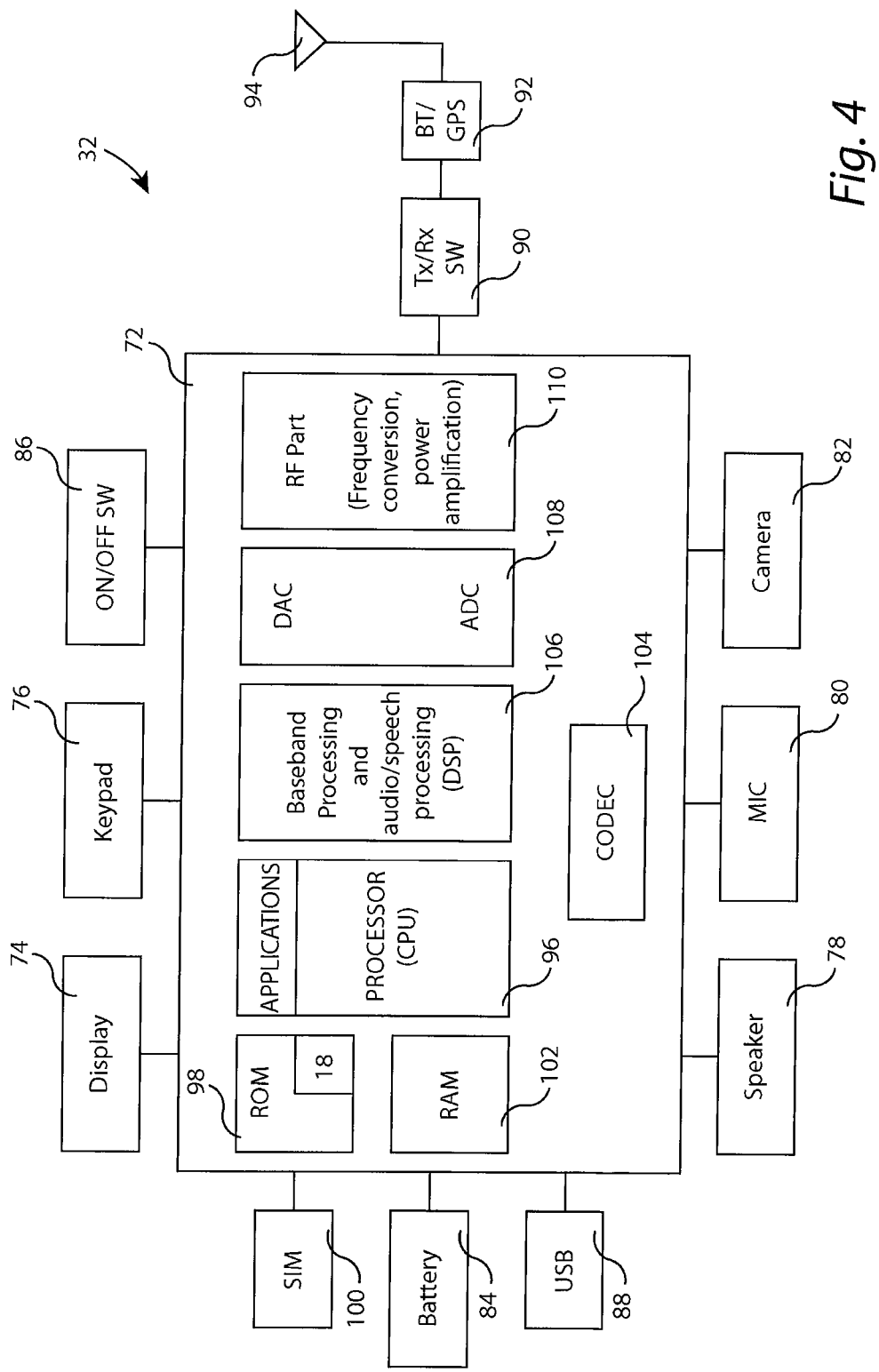
FIG. 4 is a block diagram of a cell phone with a mobile app.

FIG. 4 illustrates, by way of example and not limitation, a cell phone 32 including the main circuitry 72 and input/output (I/O) components such as a display 74, a keypad 76, a speaker 78, a microphone 80 and a camera 82. Main circuitry 72 is powered by a battery 84 and is turned on and off with a switch 86. In this example embodiment, the main circuitry 72 is provided with a universal serial bus (USB) 88. A transmit/receive (Tx/Rx) switch 90 and a Bluetooth/GPS (BT/GPS) module 92 couple an antenna 94 to the main circuitry 72.

Main circuitry 72 of cell phone 32 includes a processor (CPU) 96, capable of running applications (apps) and read only memory (ROM) 98 coupled to the CPU 96. In this non-limiting example, app 58 is stored in ROM 98, which can be, for example, an electrically erasable, programmable read only memory (EEPROM) or flash memory. Other memory include random access memory (RAM) 102, and a removable subscriber identity module (SIM) 100 which identifies the subscriber and device. The example main circuitry 72 also includes a CODEC 104, a baseband processing and audio/speech processing digital signal processor (DSP) 106, a digital to analog converter (DAC) and analog to digital converter (ADC) 108, and a RF part 110 for frequency conversion, power amplification, etc.

FIG. 5 is a flow diagram of an example EMP-OS component 18 process. In this non-limiting example, code segments of EMP-OS component 18 implement a process that begins at 112 and, in an operation 113, it is determined if an emergency call is being made on cell phone 32. For example, the user of the cell phone may be dialing 9-1-1. If no emergency call is being made, the process 18 idles in operation 113 until an emergency call has been initiated.

After operation 113 detects that an emergency call is being made, it is determined if an RF beacon signal is detected in an operation 114. If operation 114 detects an RF beacon signal, an operation 115 determines if the detected RF beacon includes a tag. It should be noted that not all beacon signals detected by EMP-OS component 18 will include tags, e.g. they are beacons from devices that do not include EMP-AP component 16 from an ISP. If a tag is detected by operation 115, the beacon frame parameters, including the tag information, are stored in an operation 116. Next, an operation 117 retrieves the beacon frame parameters and one or more tags are embedded in an emergency call stream in an operation 118, if tags are available. It should also be noted that the process of EMP-OS component 18 can store information about a number of tags which can be analyzed for usefulness in determining a civic address, or which can be forwarded as a group along with an emergency call. For example, when there are multiple tags, they can be ranked as primary, tertiary, etc. for location purposes by first responders. Also, with multiple tags, the location of the mobile device can be more accurately determined within the multiple WiFi footprints.

With continuing reference to FIG. 5, it is next determined in an operation 119 if a cellular network is available. If so, the emergency call stream, with embedded tags, if available, is sent via the cellular network in an operation 120. If the cellular network is not available, an operation 121 determines if a data network is available and, if so, the emergency call stream with the one or more embedded tags, if available, is sent over the data network in an operation 122. If the data network is not available, it is determined if the internet is available in an operation 123 (e.g. via WiFi) and, if so, the emergency call streams with the one or more embedded tags, if available, is sent via the internet in an operation 124. If no network is available, an operation 125 determines that the emergency call has failed. After any of operations 120, 122 and 124, and operation 126 sends cell phone location information to the EMP server using internet protocol (IP). For example, a cell phone 32 can send location information such as GPS, AGPS and the WiFi Universal Resource Locator (URL) information over the internet to the EMP server 12. While in this non-limiting example, the hierarchy of networks is first cellular, second data and third internet, in other embodiments the hierarchy may be different, or the emergency call stream with the one or more embedded tags may be sent through multiple networks or other networks available to the caller.

With additional reference to FIG. 1, and by way of non-limiting example, if cell phone 32 is within R2, it is likely within range of AP 30B. EMP-OS component 18, residing on cell phone 32, is activated by the initiation of an emergency phone call by the cell phone user. The EMP-OS component 18 retrieves the tag (Tag 2) from the beacon frame transmitted by AP 30B, and stores it in local memory, and any other tags that is may receive, e.g. from beacon frames transmitted by AP 30A and/or AP 30B. EMP-OS component 18 then embeds the one or more tags (if available) into the emergency call stream before sending the emergency call over an appropriate network. Additionally, the GPS location of the cell phone 32 can also be transmitted to the EMP server 12 via the internet 22 using internet protocol (IP). The EMP server 12 then queries the ESN DB 14 to determine to which ESN portal ("emergency call center") the call, along with its tag, should be sent. An ESN operator 28 of the emergency call center then can converse with the cell phone 32 user, while retrieving the civic address of the user via the ESN DB server 14.

A beacon frame is one of the management frames in IEEE 802.11 based WLANs. It contains all of the information about the network. Beacon frames are transmitted periodically to announce the presence of a wireless LAN. Beacon frames are transmitted by the access point (AP) in an infrastructure basic service set (BSS). In IBSS network beacon generation is distributed among the stations. Beacon frames include an Ethernet header, body and frame check sequence (FCS). Some of the fields include:

Timestamp—after receiving the beacon frame, all the stations change their local clocks to this time. This helps with synchronization.

Beacon interval

Capability information (16 bits)—capability of the device/network including type of network, support for polling, encryption details, etc.

Service Set Identifier (SSID) is a sequence of 0-32 octets. It is used as an identifier for a wireless LAN, and is intended to be unique for a particular area. It is often a human readable string entered by a user, aka "network name."

In the present example, the EMP-OS component 18 is preferably unable to rename the SSID.

Figure 6:
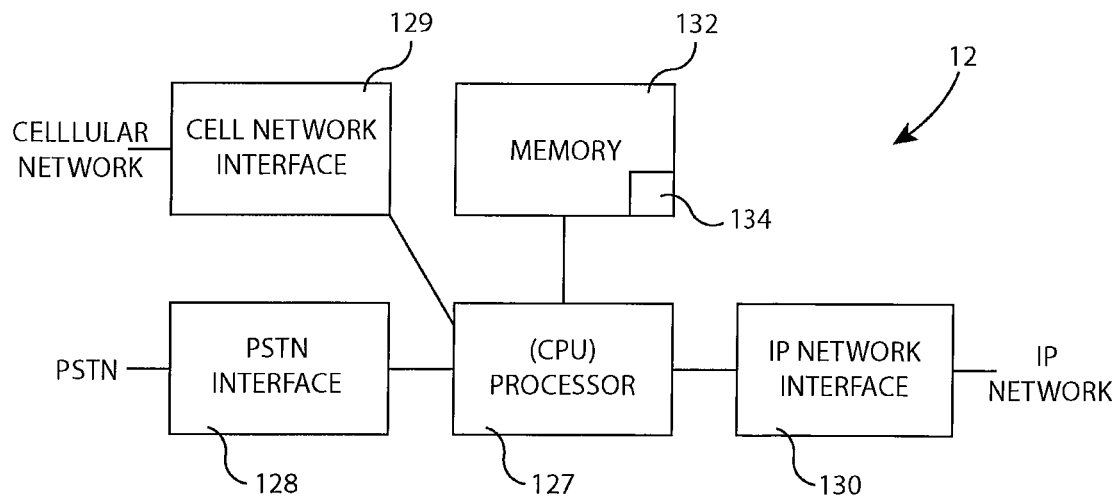
FIG. 6 is a block diagram of an emergency mobile positioning (EMP) server.

In FIG. 6, an example emergency mobile positioning (EMP) server 12 includes a processor (CPU) 127, a public switched telephone network (PSTN) interface 128 coupling a PSTN to the processor 127, a cell network interface 129, and an IP network interface 130 coupling an IP network to the processor 127. In some examples, the IP network includes the internet, and in other examples the IP network is a virtual private network (VPN). It should be noted that other networks can also be coupled to the CPU 127, to the extent that they are now or in the future are available. For example, legacy and video inputs can also be coupled to CPU 127. Memory 132, including code segments 134 which helps route the call to an optimal emergency call center, is also coupled to the processor 127.

Figure 7:
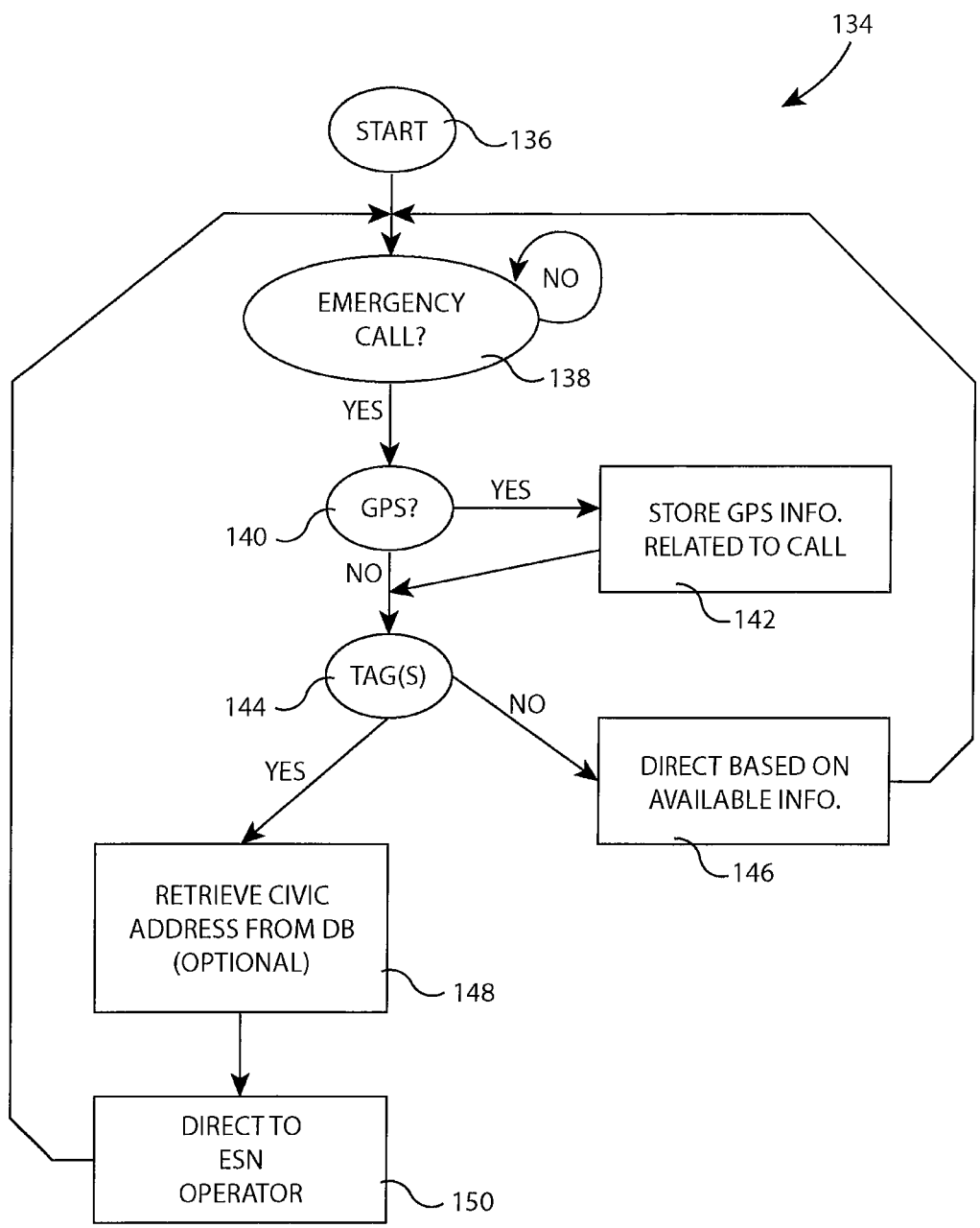
FIG. 7 is a flow diagram of a process implemented by the EMP server of FIG. 6.

FIG. 7 is a flow diagram of a process implemented by the code segments 134 stored in the memory 132 of EMP server 12. The process 134 begins at 136 and, in an operation 138, it is determined if an emergency call is coming in via the PSTN interface 128. If not, the operation 138 idles until a call does arrive. If there is an emergency call, it is determined if there is GPS information associated with that call arriving at IP Network interface 130. If so, the GPS information related to the emergency call is stored in an operation 142. The EMP server 12 can determine that the GPS information is related to the emergency call in a number of ways, including matching GPS coordinates (and other mobile phone derived location information) with the emergency call, or using the mobile device phone number or other identifier (e.g. one or more tags) to match with the voice call.

Next, an operation determines if the emergency call has one or more embedded tags in an operation 144. If not, the emergency call is directed based upon the best available information (e.g. GPS, if available) to an emergency call center in an operation 146, after which process control returns to operation 138. If operation 144 does detect one or more embedded tags, an operation 148 optionally retrieves a civic address from the ESN DB server 14 based upon the tag(s), and the call is directed to an ESN operator 28 in an operation 150.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An emergency location informer system comprising:
   an emergency mobile positioning (EMP) server communicating over a public switched telephone network (PSTN), a cellular network and an Internet protocol (IP) network;
   an emergency service number (ESN) database server storing known civic addresses and associated tags of wireless access points (APs) that are provided by an Internet service provider (ISP) over the IP network;
   an EMP-AP component stored in non-transitory computer readable media and executing on a processor of a wireless access point (AP) at a civic address known to the ISP, the EMP-AP component communicating tag information with the ISP over the IP network, the tag information including a tag associated with the civic address and stored in the ESN database server, the tag forming a part of a radio frequency (RF) beacon signal transmitted by the AP, wherein the EMP-AP component is generated by the ISP, transmitted to the AP over the IP network and stored in the non-transitory computer readable media of the AP, the EMP-AP component including code segments for embedding the tag into beacon frames of the RF beacon signal along with other beacon information provided by the AP; and
   an EMP-OS component incorporated into an operating system (OS) and executing on a processor of a cell phone and operative to monitor the beacon signal of the AP and to store the tag, the EMP-OS component being further operative to embed the tag in an emergency call from the cell phone to the EMP server over a network, wherein the EMP-OS component is further operative to transmit at least one of global positioning system (GPS), Assisted GPS (AGPS) and Uniform Resource Locator (URL) information to the EMP server over the IP network;
   whereby the EMP server receives the tag embedded in the emergency call such that the civic address associated with the tag can be retrieved from the ESN database server; and
   wherein the EMP server communicates over the IP network with an ESN operator who provides the tag to the ESN database to obtain the associated civic address.

2. The emergency location informer system as recited in claim 1 wherein the EMP-OS component monitors a plurality of beacon signals, stores a plurality of tags and embeds multiple tags in the emergency call.

3. An emergency mobile positioning server comprising:
   a processor;
   a public switched telephone network (PSTN) interface coupled to the processor;
   a cellular network interface coupled to the processor;
   an internet protocol (IP) network interface coupled to the processor;
   memory coupled to the processor, including code segments executable by the processor including:
   (a) code segments receiving an emergency call via one or more of the PSTN interface, the cellular network interface, and the IP network interface;
   (b) code segments determining if there is location information related to the emergency call;
   (c) code segments storing the location information if there is location information related to the emergency call;
   (d) code segments determining if there is an embedded tag for the emergency call;
   (e) code segments directing the emergency call to an emergency call center based upon available information if there is no embedded tag for the emergency call;
   (f) code segments providing bi-directional communication with an emergency service number (ESN) database server via the IP network interface, wherein the ESN database server includes known civic addresses and associated tags of wireless access points (APs);
   (g) code segments directing the emergency call with the embedded tag to an emergency call center if there is an embedded tag for the emergency call;
   wherein the internet service provider (ISP) provides tag and associated civic address information to the ESN database server over an IP network and provides, over the IP network, an EMP-AP component to a wireless access point (AP) to serve as part of an AP operating system, the EMP-AP component including code segments to embed a tag associated with a civic address of the ESN database server in a beacon frame of a radio frequency (RF) beacon signal of the AP such that the tag can be incorporated into an emergency call from a cell phone receiving the beacon frame; and
   wherein the emergency call with the embedded tag is received by an ESN operator of the emergency call center.

4. The emergency mobile positioning server as recited in claim 3 wherein the ESN operator queries the ESN database server with the tag to retrieve the civic address.

5. The emergency mobile positioning server as recited in claim 3, wherein the memory further comprises codes segments executable on the processor for receiving at least one of global positioning system (GPS), Assisted GPS (AGPS) and Uniform Resource Locator (URL) information associated with the emergency call via the IP network interface.

6. The emergency mobile positioning server as recited in claim 5, wherein the memory further comprises:
code segments querying the ESN database to retrieve civic address information; and
code segments for verifying the civic address information with the at least one of global positioning system (GPS), Assisted GPS (AGPS) and Uniform Resource Locator (URL) information.

7. The emergency mobile positioning server as recited in claim 3 further comprising code segments receiving an emergency call with a plurality of tags.

8. The emergency mobile positioning server as recited in claim 7 further code segments querying the ESN database server with the plurality of tags to obtain civic address information related to the plurality of tags.

9. An emergency location informer system comprising:
an emergency mobile positioning (EMP) server communicating over a public switched telephone network (PSTN), a cellular network and an Internet protocol (IP) network;
an emergency service number (ESN) database server storing known civic addresses and associated tags of wireless access points (APs) that are provided by an internet service provider (ISP) over the IP network;
a wireless access point (AP) EMP-AP component executing on a processor of an AP at a civic address and with a Universal Resource Locator (URL) known to the ISP, the EMP-AP component providing a tag associated with the civic address and stored in the ESN database server, known to the ISP, wherein the tag is embedded in a beacon frame that is continuously transmitted as a part of a radio frequency (RF) beacon signal with other beacon information provided by the AP; and
a mobile operating system (OS) EMP-OS component executing on a processor of a cell phone and operative to monitor the beacon signal of the AP and to retrieve and store the tag on the cell phone, the EMP-OS component being further operative to embed the stored tag in a subsequent emergency call from the cell phone to the EMP server over a network wherein the EMP-OS component is further operative to transmit global positioning system (GPS) information to the EMP server over the IP network;
whereby the EMP server receives the tag of the AP embedded in the subsequent emergency call such that the civic address associated with the tag of the AP can be retrieved from the ESN database server; and
wherein the EMP server communicates over the IP network with an ESN operator who provides the tag to the ESN database to obtain the associated civic address.

10. An emergency mobile positioning server comprising:
a processor;
a public switched telephone network (PSTN) interface coupled to the processor;
a cellular network interface coupled to the processor;
an internee protocol (IP) network interface coupled to the processor;
memory coupled to the processor, including code segments executable by the processor including:
(a) code segments receiving an emergency call with an embedded tag associated with a wireless access point (AP) having a known civic address via one or more of the PSTN interface, the cellular network interface, and the IP network interface;
(b) code segments querying an emergency service number (ESN) database server storing known civic addresses with associated tags of wireless access points (APs) via the IP network interface with the embedded tag of the emergency call to obtain civic address information; and
(c) code segments directing the emergency call with the embedded tag to an emergency call center associated with the known civic address information of the AP associated with the embedded tag;
wherein an internet service provider (ISP) provides tag and civic address information to the ESN database server;
wherein the tag is transmitted in a radio frequency (RF) beacon signal by a wireless access point (AP) connected to the ISP;
wherein the ISP provides an EMP-AP component as part of an AP operating system that includes code segments which add the tag to a beacon frame; and
wherein the emergency call with the embedded tag is received by an ESN operator of the emergency call center.

11. The emergency mobile positioning server as recited in claim 10 wherein the ESN operator queries the ESN database server with the tag to retrieve the civic address.

12. The emergency mobile positioning server as recited in claim 10, wherein the memory further comprises codes segments executable on the processor for receiving GPS information associated with the emergency call via the IP network interface.

13. The emergency mobile positioning server as recited in claim 12, wherein the memory further comprises code segments for verifying the civic address information with the GPS information.

14. Non-transitory computer readable media comprising code segments executable on a processor of a wireless access point (AP) comprising:
code segments communicating tag information between an internet service provider (ISP) coupled to the AP and a wireless access point (AP) located at a civic address, wherein the tag is generated by at least one of the AP and the ISP and is stored, by the ISP, on an emergency service number (ESN) database server along with the known civic address of the AP, whereby the ISP is a trusted source;
code segments embedding the tag in a beacon frame with other beacon information normally provided by the AP; and
code segments transmitting the beacon frame as a radio frequency (RF) beacon signal, whereby the tag can be incorporated into an emergency call from a cell phone receiving the beacon frame;
whereby an ESN operator is provided the emergency call and provides the tag to the ESN database to obtain the associated civic address.

15. Non-transitory computer readable media as recited in claim 14 wherein the beacon frame is a WiFi beacon frame.

16. Non-transitory computer readable media as recited in claim 15 further comprising code segments for transmitting at least one of global positioning service (GPS), Assisted GPS (AGPS) and Uniform Resource Locator (URL) information via an internet protocol (IP) network after detecting an emergency call being made by the cell phone.

17. Non-transitory computer readable media as recited in claim 14 wherein the beacon frame is a Bluetooth beacon frame.

18. Non-transitory computer readable media as recited in claim 14 further comprising code segments monitoring a plurality of RF beacon signals, storing a plurality of tags in the memory of the cell phone, and embedding multiple tags in the emergency call.

19. Non-transitory computer readable media as recited in claim 18 further comprising code segments for ranking the multiple tags for location purposes by first responders.

20. Non-transitory computer readable media comprising code segments executable on a processor of a cell phone comprising:
   code segments monitoring radio frequency (RF) beacon signals for a wireless access point (AP) tag that is associated with a civic address of the AP and which is generated by an internet service provider (ISP) as a trusted source, wherein the tag and the civic address are stored in an emergency service number (ESN) database server by an internet service provider (ISP), wherein the ISP and the AP communicate tag information over the IP network and wherein the tag was generated by at least one of the AP and the ISP;
   code segments storing the beacon frame parameters including the tag in a memory of the cell phone if a tag is detected;
   code segments detecting an emergency call being made by the cell phone; and
   code segments embedding the tag in an emergency call stream such that the civic address of the AP can be determined by searching a database of known civic addresses of access points and associated tags stored on the internet and maintained by one or more trusted sources;
   whereby an ESN operator provided with the emergency call uses the tag to obtain the associated civic address from ESN database.

21. Non-transitory computer readable media comprising code segments executable on a server comprising:
   (a) code segments receiving an emergency call via one or more of a PSTN interface, a cellular network interface, and an IP network interface;
   (b) code segments determining if there is location information related to the emergency call;
   (c) code segments storing the location information if there is location information related to the emergency call;
   (d) code segments determining if there is an embedded tag associated with a wireless access point (AP) having a known civic address for the emergency call;
   (e) code segments directing the emergency call to an emergency call center based upon available information if there is no embedded tag for the emergency call;
   (f) code segments providing bi-directional communication with an emergency service number (ESN) database server via an IP network interface, wherein the ESN database server includes known civic addresses and associated tags for a plurality of APs; and
   (g) code segments directing the emergency call with the embedded tag to an emergency call center if there is an embedded tag for the emergency call, whereby the emergency call is provided to an ESN operator who uses the tag to obtain the associated civic address from the ESN database server;
   wherein an internet service provider (ISP) provides tag and civic address information to the ESN database server;
   wherein the tag is transmitted in a radio frequency (RF) beacon signal by a wireless access point (AP) connected to the ISP; and
   wherein the ISP provides an EMP-AP component as part of an AP operating system that includes code segments which add the tag to a beacon frame.

\* \* \* \* \*